United States Patent [19]

Williams

[11] 4,090,470
[45] May 23, 1978

[54] LITTER BOX

[76] Inventor: Robert W. Williams, 429 Cedar St., Lansdale, Pa. 19446

[21] Appl. No.: 694,190

[22] Filed: Jun. 9, 1976

[51] Int. Cl.² ............................................. A01K 29/00
[52] U.S. Cl. .......................................... 119/1; 119/160
[58] Field of Search ................ 119/1, 19, 160; 220/87

[56] References Cited

U.S. PATENT DOCUMENTS

| | | | |
|---|---|---|---|
| 1,131,102 | 3/1915 | Aldrich | 220/87 X |
| 1,397,260 | 11/1921 | Trottier | 220/87 |
| 3,428,026 | 2/1969 | Sohmers et al. | 119/160 X |
| 3,793,989 | 2/1974 | Clark | 119/1 |
| 3,872,832 | 3/1975 | Quinn | 119/1 |
| 3,965,863 | 6/1976 | Scott | 119/1 |

*Primary Examiner*—Jay N. Eskovitz
*Attorney, Agent, or Firm*—Joseph W. Molasky

[57] ABSTRACT

A litter box for use by cats which, in addition to providing a filler for waste, also includes a deodorizing or disinfecting element to overcome the odor problems associated with litter boxes. The said element is comprised of an absorbent material impregnated with a deodorizing or disinfecting agent housed beneath the litter container within a perforated cartridge which serves to protect it from contact by animals or humans. In addition, the said cartridge serves to regulate the flow of the deodorant into the surrounding atmosphere.

6 Claims, 7 Drawing Figures

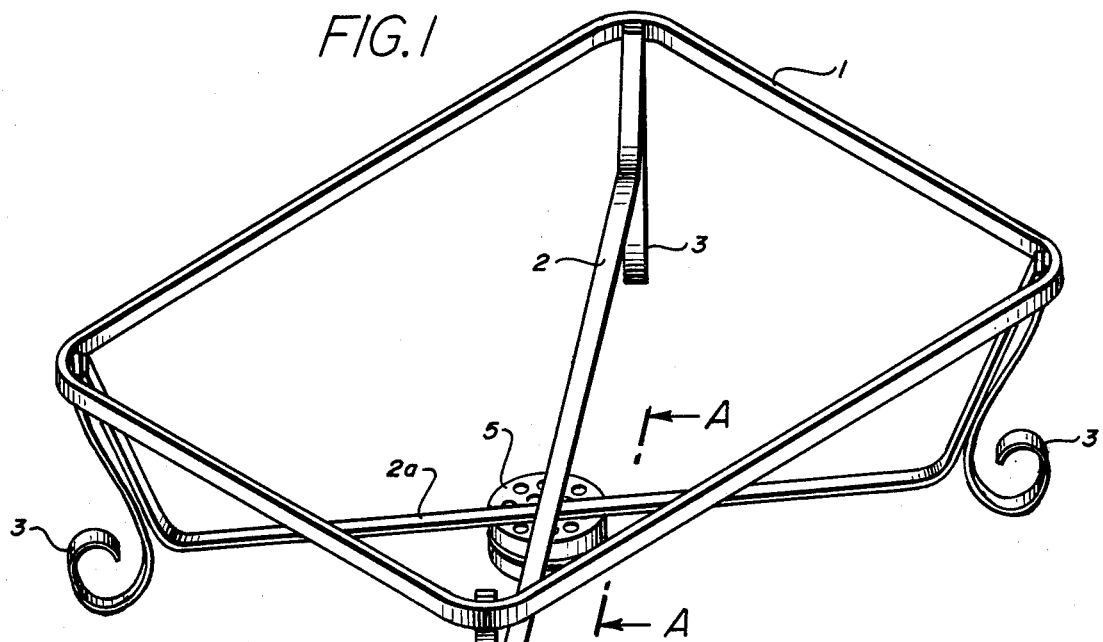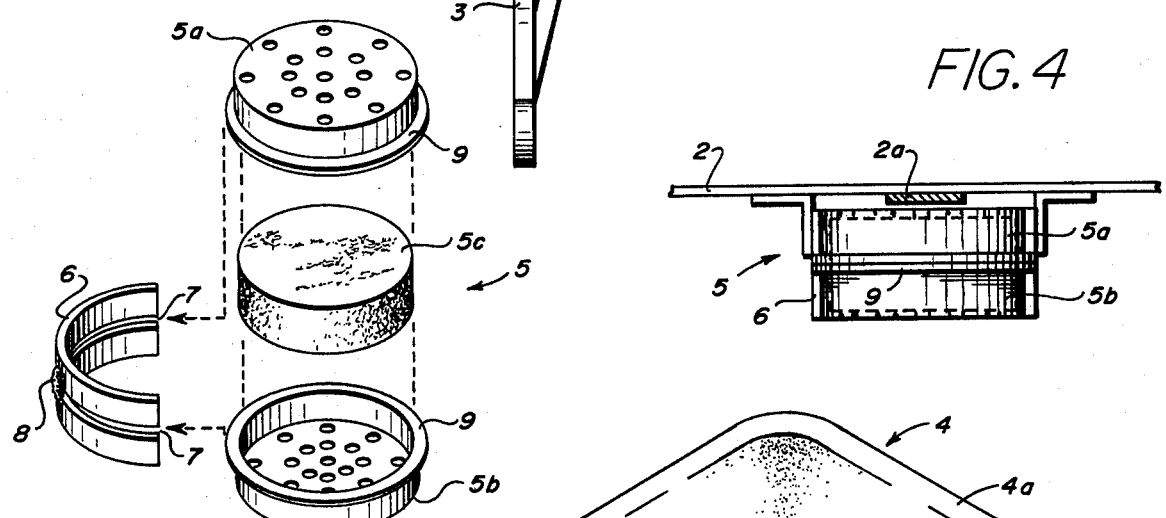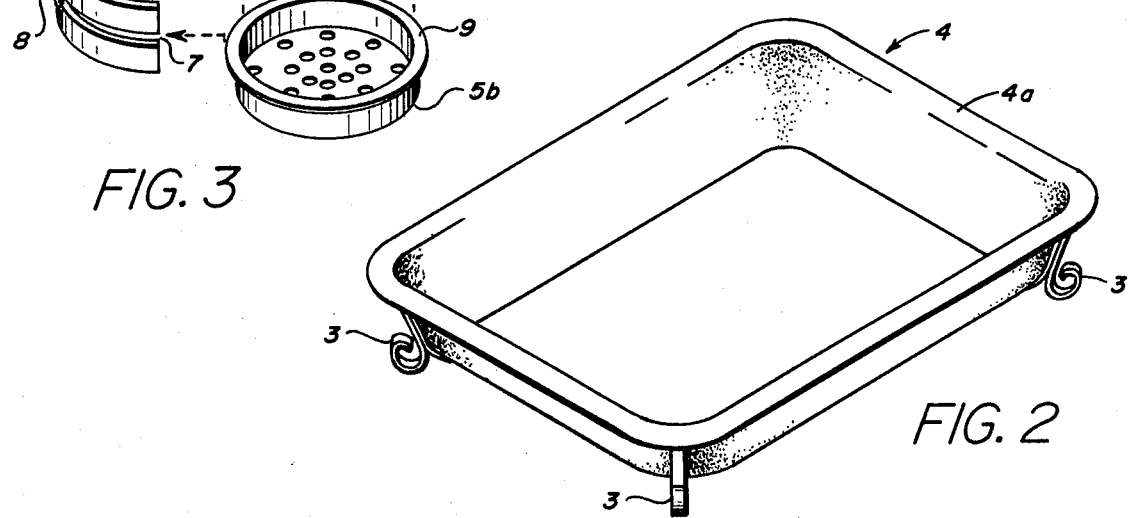

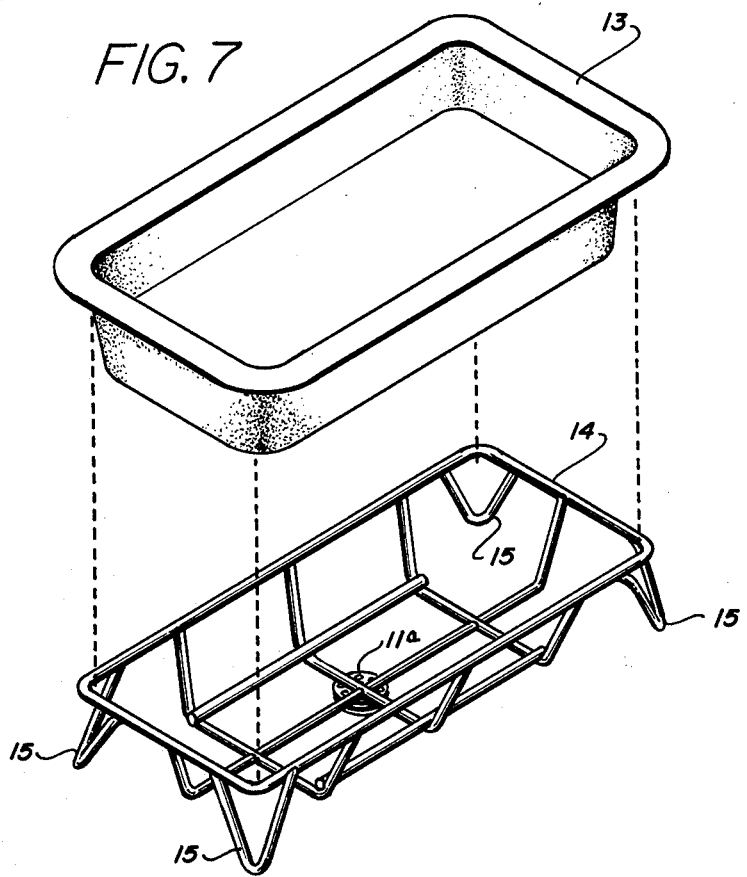
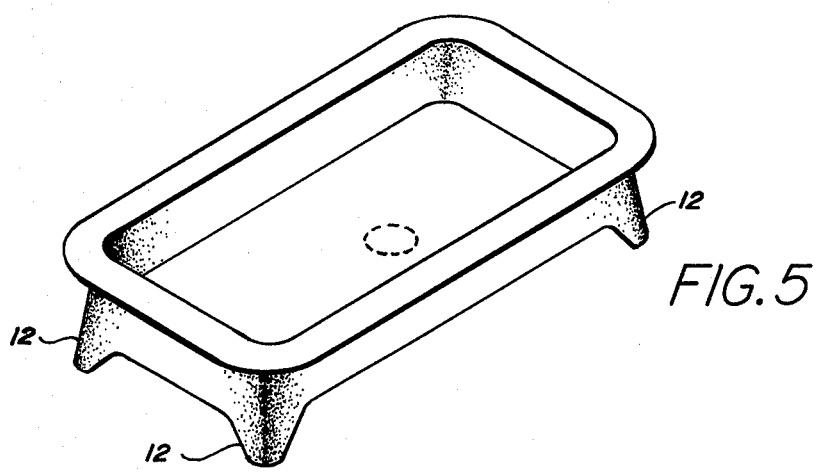
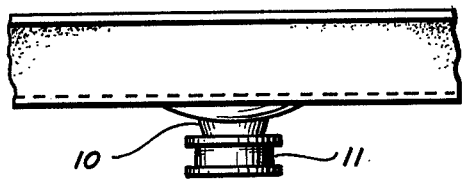

LITTER BOX

BACKGROUND OF THE INVENTION

The most common type of apparatus for cats is the litter box, sometimes referred to simply as a cat box. This type of receptacle usually contains a loose material, such as sand or sawdust which functions as an absorbent while still making it possible for the cat to bury his waste conveniently.

Litter boxes of this type work fairly well over the short term but, after several days of waste-buildup the absorbent material usually becomes saturated with excrement and emits a very unpleasant odor.

To overcome this problem some litter material is treated with a deodorizing substance so as to mask the otherwise offensive odor. In principle, this would seem to be a satisfactory solution to the problem; however, in practice, the effect is usually disappointing. This is due to the fact that the cat waste comes into direct contact with the deodorant and negates its deodorizing effect.

The reaction which occurs between the deodorant and waste material is not fully understood and no effort is made here to explain it; nevertheless, it is a known fact that deodorants which are added directly to absorbent litter generally have a very short effective life and for all practical purposes, they are ineffective in curing the waste-odor problem.

THE INVENTION

This invention effectively overcomes the odor problem associated with cat litter boxes.

More particularly, this invention overcomes the odor problem by maintaining the litter material separate and apart from the deodorizing substance.

More precisely, the superior deodorizing effect of this invention is achieved by maintaining the deodorant in a perforated container which protects it from accidental contact and, at the same time, places the deodorant in a position where it is capable of permeating the entire area in and around the cat litter box. By virtue of this improvement the integrity of the deodorant can be maintained over a substantially long period of time.

Still another advantage of this invention lies in its economy and safety. Thus, the deodorant is housed beneath the receptacle which contains the litter material and, therefore, it is virtually impossible for it to come into contact with unsuspecting adults or children.

The economies of this invention are achieved by maintaining the deodorant in a perforated cartridge. As a result the surface of the deodorant is largely shielded from direct contact with the atmosphere and, therefore, it cannot be easily dissipated.

The perforated cartridge also affords still another advantage. By spacing the holes evenly around the top and bottom of said cartridge, a uniform and controlled distribution of deodorizing vapors is achieved.

Still another object is to use this invention for the dissemination of a disinfectant or, alternatively, for the dissemination of a substance which is both a disinfectant and a deodorant.

Still another object of this invention consists in disseminating the disinfectant and/or deodorant in a vaporous form so that it can be thoroughly disseminated throughout the immediate area and thus combat the offensive odor generated by the cat waste.

Another advantage to this particular mode of deodorizing action lies in the fact that deodorants of uncommon strength can be employed in the practice of this invention. The reason for this lies in the fact that the element which encompasses the deodorant can control its release so effectively, that it is possible to utilize deodorants which, if put into direct contact with cats and humans, would have an adverse effect on same.

In general, the device of this invention is characterized by the presence of a material attached to the underside of said device where it emits a deodorizing odor and disinfecting vapor.

More specifically, and from a functional standpoint, the device of this invention has:
  (a) an upperside which is characterized by an accommodating opening capable of receiving a container for cat litter; and
  (b) an underside with holding means for accommodating an element which emits deodorizing vapors.

From an apparatus standpoint, the device of this invention is a combination of elements which combine to form a cat litter device adapted to receive a deodorizing element. In a preferred aspect of this invention the said device comprises:
  (1) a continuous rectangular strip which defines the periphery of the upperside of the device and a support means for the litter container;
  (2) the rectangular strip 1 also provides an opening, the inner side walls of which are adapted to receive the litter container;
  (3) the litter container itself is one whose dimensions correspond essentially to the shape of the rectangular strip 2 as defined by the inner side walls of said strip;
  (4) the rectangular strip 1 is supported by two braces which run diagonally from one corner of the rectangular strip to the other and which intersect one another at about their midpoint. The manner of connecting these braces to the rectangular strip 1 is effected by joining them at their terminal ends to the opposing inner side wall corners of the rectangular strip. In addition to supporting the rectangular strip they are adapted to receive the litter container 3 and provide it with support along its bottom surface.
  (5) Four leg members are connected to each of the four corners of the rectangular strip 1 and these serve to maintain the device above ground level, thus making it possible for the deodorizing element (connected to the underside of the braces) to emit its deodorizing odor.
  (6) Bonded to the underside of the brace members, at their intersect point, is a holding means which is adapted to receive the deodorizing element.
  (7) When the deodorizing element is fitted into the holding means 6 the vapors emitted therefrom permeate the entire area beneath and around the litter device and thus serve to effectively eliminate any unpleasant odors eminating from the litter material.

The deodorizing element which is utilized in this device is generally, a two-piece container consisting essentially of a perforated top cover and a perforated bottom cover. This element is made functional by simply depositing the deodorant into the bottom cover and placing the perforated top cover into a mating alignment with the former so that the common lip which circumcribes both their circumferences is brought into alignment; thereupon, the combination of the two lips form a ridge which fits into a groove in the holding means where it is maintained by frictional engagement.

The subject matter of this invention will now be described in greater detail by reference to The Drawings.

THE DRAWINGS

FIG. 1 is a perspective view of a litter box absent the litter container.

FIG. 2 is a top perspective view of the litter box of FIG. 1 fully assembled.

FIG. 3 is an exploded perspective view of the several elements comprising a deodorizing element and its support means.

FIG. 4 is an exploded cross-sectional view of the deodorizing element shown in FIG. 1 along A—A.

FIG. 5 is a perspective view of a second litter box of this invention.

FIG. 6 is an exploded side view of the deodorizing element which is used in the litter box of FIG. 5.

FIG. 7 is a perspective view of a third litter box according to this invention.

THE EMBODIMENTS

This invention will now be described with greater particularity by reference to The Drawings and, also, to the specific examples.

FIGS. 1-4 illustrate one embodiment of this invention. In these illustrations the device is constructed of wrought iron but it is to be understood that other, equally suitable materials, such as plastic, may be substituted therefore.

FIG. 1 is a perspective view of the present device absent its litter container. In this illustration the structural aspects of the device are clearly set forth. Principal among these is the continuous rectangular strip 1 which defines the opening for the litter container. This rectangular strip is supported by legs 3 which are attached to each corner of strip 1.

Support braces 2 and 2a are also connected to each of legs 3 to provide them with adequate support, and the latter, in turn, are connected to the rectangular strip 1. In addition to providing support for legs 3 and rectangular strip 1, said braces 2 and 2a also serve to define a pocket which is adapted to receive the contours of the litter container 4 (FIG. 2).

The deodorizing element 5 in FIG. 1 is held beneath braces 2 and 2a at its intersect by virtue of two support angles (FIG. 4) attached to the holding means 6.

The holding means 5 consists of two elements which are held in a fixed relationship but apart from one another by a weld 8 so as to define a groove 7 into which the aligned lips 9 of top cover 5a and bottom cover 5b can be slidingly engaged.

To practice this invention an absorbent material is impregnated with deodorant and inserted into the combination of top cover 5a and bottom cover 5b and the aligned lips of said covers are then inserted into groove 7 of holding means 6. Thereafter, the container 4 is placed into the opening defined by a rectangular strip 1 and it is filled with conventional cat litter material. The litter container 4 possesses an outer edge 4a which serves to support the said container by virtue of its contact with the upper surface of the rectangular strip 1.

FIGS. 5 and 6 illustrate a second embodiment of this invention. In this embodiment the litter box is of unitary construction and consists essentially of a litter container and support means combined as an integral unit. A litter box of this type is easily cleaned and maintained. In addition, it can be easily fabricated and inexpensively mass-produced by molding means.

In the litter box of FIG. 5 the deodorizing means consists essentially of a deodorizing cartridge which attaches to a boss located on the underside of said tray. A breakaway side view of this deodorizing means is depicted in FIG. 6.

As shown in FIG. 6 a boss 10 is molded to the underside of the litter tray of FIG. 5 at about its midpoint. This boss may be threaded or have captive design features which will serve to accept the deodorizing cartridge 11. This deodorizing cartridge is essentially a container which is either threaded or has other accommodating means for attachment to the boss 10. The deodorizing cartridge 11 is essentially a container with perforations in its underside and, optionally, in its sides so as to provide for the escape of the deodorizing vapors from the deodorizing material which is contained therein.

Alternatively, the cartridge 11 can be adapted to hold the deodorizing material in a sandwich-type mode. In this holding means the absorbent 5c, impregnated with deodorant, is held between an upper plate and a lower plate and a pin is inserted through both plates and through the absorbent 5c so as to hold all three elements in a fixed and unitary fashion. This combination of elements is then secured to a holding means which is threaded so as to accommodate the threaded boss 10.

The legs 12 of this litter tray (FIG. 5) are of sufficient height as to permit the deodorizing vapors which emanate from cartridge 11 to permeate the entire area beneath and around said tray. When the deodorizing cartridge is expended it is removed from the underside of the tray and simply replaced by a new cartridge; or, alternatively, the expended cartridge can be regenerated by emersing it in a solution of a deodorizing material.

The litter device of FIG. 7 is a combination of a commercially available cat litter tray 13 and an accomodating cradle 14. Located beneath tray 13 at approximately its epicenter, is an element which accepts the deodorizing cartridge 11a. The cradle 14 of this device may be constructed of heavy wire, metal stripping or wrought iron. This combination of litter tray and cradle can be inexpensively produced and lends itself to easy maintenance.

The cradle 14 is supported by four legs 15 which maintain it above the floor level; thus permitting the deodorizing vapors from cartridge 15 to disseminate over the entire area beneath and around the litter device.

The type of deodorant which is used in this invention is not particularly critical and, in practice, any common carbolic may be utilized.

Also, disinfectants may be used in lieu of the deodorizing agent or, if desired, it is possible to combine substances which exhibit both disinfectant and deodorant properties. In the description which follows this invention will be described by reference to the use of a deodorant; however, it is to be understood that compounds which are solely disinfectants or which combine their disinfectant properties with a deodorizing activity may be substituted therefor with predictably good results.

In preparing the deodorant material for use in this invention the practitioner simply takes a solid or semisolid deodorant of the type commonly available and cuts it to size so that it fits snuggly within the container formed from covers 5a and 5b.

Alternatively, in lieu of cutting a deodorant to size, the practitioner may formulate his own deodorizing agent. Thus, for example, a deodorant suitable for use in this invention may be prepared by simply taking an absorbent material of natural or synthetic origin, shaping it to the desired size and saturating it with a deodorizing solution.

Absorbent materials which may be used for this purpose include, for example, plant fiberous materials such as cotton, wool or linen, cellulose-based products such as absorbent papers, natural and sponge rubber or slow-release plastics.

Other materials which may be utilized include finely divided mineral supports such as kaolin, diatomaceous earth, bentonite, pumice, attapulgite, dolomite, limestone, gypsum and any natural or artificially agglomerated porous mineral substance of a siliceous, aluminous, silico-aluminous, silico-calco-aluminous, silico-calcareous, calco-aluminous, or calcareous nature.

However, regardless of origin it is only necessary that the absorbent material be substantially inert and capable of absorbing from about 20 – 99% of its weight in water to be an effective absorbent. In this connection, a preferred embodiment consists of using materials having a loose matted fiber construction capable of absorbing from about 60 – 90% of their weight in water.

The porosity of the natural or artificially agglomerated solid porous mineral support should be as great as possible so as to retain, by absorption, as large an amount of deodorizing material as possible. For the same reasons, the dimensions of the pores should be as small as possible, so that the capillary forces may apply a retaining action to the material and effectively control the evaporation of the deodorant. Thus, for example, in a porous support of amosite-silica agglomerate, the said support may have a porosity of 68 percent and the pores may have an average dimension of 500 Angstrom units and a specific surface area of about 32 square meters per gram.

The deodorant composition which can be applied to the foregoing absorbents are any of the conventionally available deodorant materials. Typical of these are the following:

(1) Aluminum sulfate (deodorant), sodium aluminum lactate, and a fragrance combined in a suitable vehicle such as lanolin; or
(2) Aluminum chloride (deodorant and disinfectant) in combination with a fragrance and a suitable base comprising glyceryl stearate, magnesium aluminum silicate, lapyrium chloride and lauric acid.

To render the absorbent effective it is simply brought into contact with one of the foregoing compositions. This is achieved by simply placing the absorbent into a solution of the deodorizing agent and allowing it to become completely saturated. Thereafter, it is allowed to drip-dry for several minutes and is then placed into the deodorizing element.

Alternatively, in lieu of using an inert absorbent to which a liquid deodorant has been applied, it is also possible, and sometimes preferable, to use a solid deodorant or disinfectant per se. One such material is para-dichlorobenzene (PDC). When this material is subjected to air currents, preferably currents containing water vapor, a portion of the PDC vaporizes and the resulting gas is thoroughly disseminated in and around the area of the litter box so as to effectively deodorize and disinfect the entire area.

Also, instead of PDC, it is possible to use other halogenated derivatives of similar aromatic hydrocarbons, such as ortho-dichlorobenzene (in liquid form absorbed onto an inert carrier such as kieselguhr, pumice or other similar material), to obtain substantially the same effect as with the normally solid para-dichlorobenzene.

Another useful deodorizing composition consists of para-dichlorobenzene in combination with anthacene. PDC is known to vaporize at ordinary temperatures but it has a melting point of 127° F. Consequently, if the device of this invention is left in the sum the cartridge container may become so heated as to raise the temperature therein to 127° F or higher and if this occurs the PDC may begin to drip. To avoid this possiblity, it may be desirable to combine the PDC with various proportions of anthacene so as to raise the melting point of the deodorizing composition. Thus, for example, as little as 1% anthacene in solution with para-dichlorobenzene will materially aid in preventing loss, by melting, of the PDC. Indeed, the proportions of ingredients may range as high as 50 — 50% mixtures of anthacene and para-dichlorobenzene without any material change in the deodorizing and disinfecting properties of the PDC material.

One of the more useful aspects of this invention resides in the ability to use deodorizing agents which would be considered unsafe if brought directly into contact with animals or humans. However, due to the protection afforded by covers 5a and 5b (which make direct contact with the active agent impossible) deodorants of high concentration can be safely used.

In addition to providing a barrier against direct contact, the perforated covers 5a and 5b also provide for a slow release and even distribution of the deodorizing vapors by virtue of the uniform perforations in their respective covers.

One other advantage to this invention is the fact that the deodorant is not immediately open to the atmosphere and, therefore, it is protected against a too-rapid dissipation. Thus, in addition to providing a regulated and even flow of deodorizing vapors, the instant invention also makes possible economies in the amount of material needed to achieve an effective deodorizing action.

I have described this invention with particularity and with reference to specific examples but it is to be understood that functionally equivalent materials and obvious modifications can be made to this invention without departing from the spirit and scope thereof. In so far as any such substitutions and modifications are within the purview of the artisan to perform, those changes are considered as being within the scope of this invention.

What is claimed is:

1. A cat litter device which comprises:
 (1) a continuous rectangular strip with inner side walls and an upper surface which provides a support means;
 (2) a rectangular opening with corners defined by the inner side walls of said rectangular strip;
 (3) a litter container with an open top and closed bottom surface whose dimensions are essentially the same as those defined by the inner side walls of the continuous rectangular strip and supported within said rectangular opening;
 (4) brace members connected at their terminal ends to opposite inner side walls of said rectangular strip;

said brace members being adapted to receive the litter container and provide it with support along its bottom surface;

(5) four leg members connected to each of the four corners of said rectangular strip and said terminal ends of said brace members, said leg members being of such a height as to maintain the brace members above ground level;

(6) a holding means attached to and located beneath at least one of said brace members; and (7) a deodorizing means which fits said holding means for emitting deodorant vapors throughout the area surrounding said litter container.

2. The device of claim 1 wherein the deodorizing means is a two piece container consisting essentially of a perforated top cover and a perforated bottom cover which combine to enclose a deodorizing agent.

3. The device of claim 2 wherein the perforated top cover and perforated bottom cover both possess a lip which circumscribes their circumferences.

4. The device of claim 1 wherein the lips of the perforated top cover and perforated bottom cover are aligned to slide into a groove in the holding means and are there frictionally engaged.

5. The device of claim 1 wherein the litter container possesses an outer edge which is supported by the upper surface of the rectangular strip.

6. The device of claim 1 wherein the holding means is secured to the underside of the brace members by one or more support angles.

* * * * *